Oct. 18, 1932.  A. P. STANLEY  1,883,055
COAL MINING APPARATUS
Original Filed Oct. 23, 1922   6 Sheets-Sheet 1

INVENTOR
Arba P. Stanley
BY
ATTORNEY

Patented Oct. 18, 1932

1,883,055

UNITED STATES PATENT OFFICE

ARBA P. STANLEY, OF COLUMBUS, OHIO, ASSIGNOR TO THE JEFFREY MANUFACTURING COMPANY, OF COLUMBUS, OHIO, A CORPORATION OF OHIO

COAL MINING APPARATUS

Application filed October 23, 1922, Serial No. 596,483, and in Great Britain July 22, 1922. Renewed June 4, 1926.

The present invention relates to certain new and useful improvements in coal mining apparatus of the class in which each is supported upon a wheel supported track guided truck and carries a horizontally projecting elongated kerf cutter adapted to horizontal movement relative to the truck to engage the coal to cut it.

In my co-pending application, of even date herewith, Serial No. 596,482, I have disclosed an improved mining machine comprising a main frame adapted to rest upon and slide over the mine floor, an elongated kerf cutter pivotally mounted at one end of said frame and adapted to project at either side thereof and to swing across in front of the machine to engage the coal to cut it, and power devices for the actuation of the machine and feeding and guiding devices whereby the kerf cutter may be moved relative to the main frame and the machine may be bodily moved relative to the material to be cut.

The present application refers to supporting and guiding devices adapted to cooperate with the mining machine above described whereby the field of usefulness of said machine may be materially broadened.

It is the especial object of this invention to provide, in an apparatus of the class described, a self propelling truck having supporting and guiding devices adapted to be turned to any preferred angular relation with the truck and to receive and support a mining machine, and provided with power actuated means for the vertical adjustment of said supporting devices which are operable independently of the mining machine supported thereon.

The devices by which I attain this object are fully set forth in the following specification and illustrated in the accompanying drawings of which—

Like numerals refer to similar parts in the several figures.

As shown in the drawings my improved apparatus comprises a carriage having a rigid rectangular steel framework 1 which is supported upon two axles 2 and 3 to each of which is fixed a pair of wheels 4 adapted to engage the rails 5 of a mine track. The axles 2 and 3 are connected together by an endless chain 6 and suitable sprocket wheels 7 and 8, and to the axle 3 is fitted a sprocket wheel 9 around which passes an endless chain 10 connected with the power devices provided for the propulsion of the carriage. In order that the carriage may easily travel around the sharp curves commonly met with in coal mines these axles are spaced comparatively close together, and in order that the truck may be properly balanced when the mining machine is in operative position thereon they are positioned close to one end of the frame 1, leaving a long overhanging portion 11 at the other end.

Mounted upon the truck frame 1 directly above the wheel base is a rectangular structural steel frame 12 hereinafter referred to as the turn table, adapted to rotation about a vertical axis approximately at the center of the wheel base of the truck. Means is provided in a series of apertures 13 in the truck frame for the insertion of locking pins 14 which are attached to the turn table, whereby said turn table may be locked in any preferred angular position relative to the truck frame. Antifriction rollers 15 are attached to the under side of the turn table and engage the floor plate of the truck to support the weight of the turn table.

Figure 1:
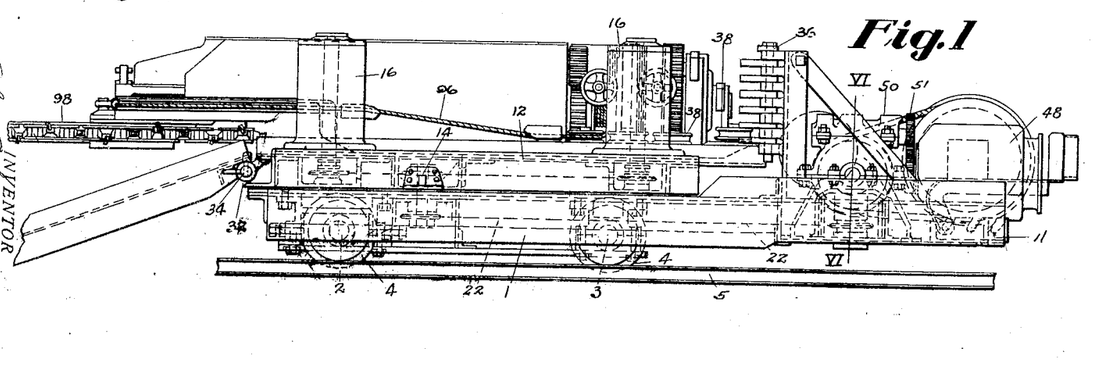
Fig. 1 is a side elevation of the apparatus as a whole.
Figure 2:
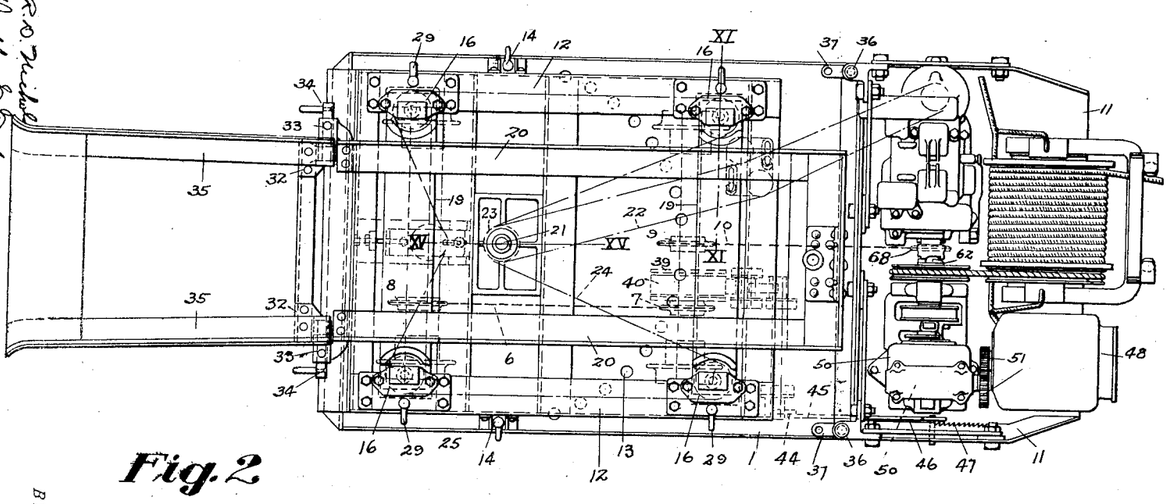
Fig. 2 is a plan view of the apparatus with the mining machine removed.
Figure 3:
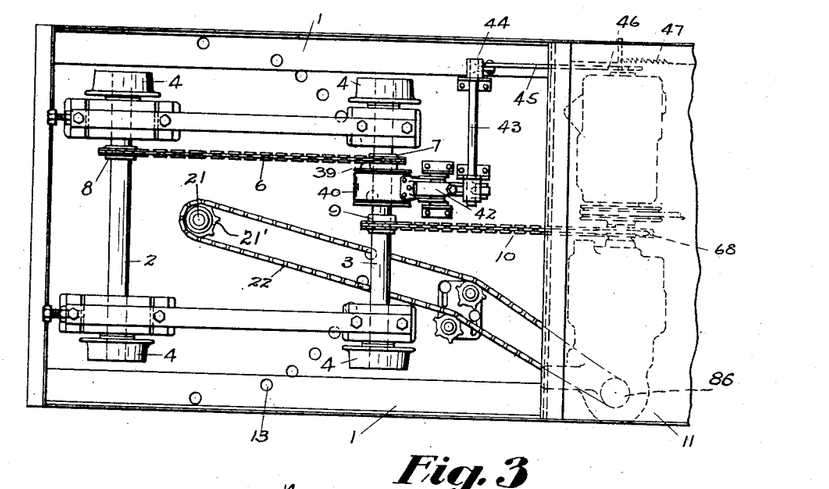
Fig. 3 is a view of the underside of the carriage.
Figure 4:
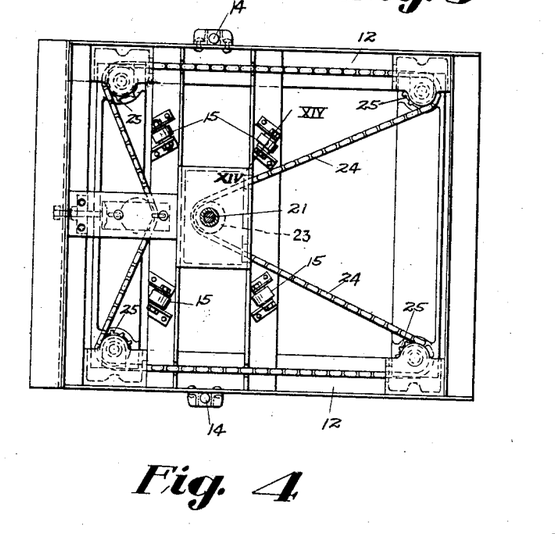
Fig. 4 is a view of the underside of the turn table element of the carriage.
Figure 5:
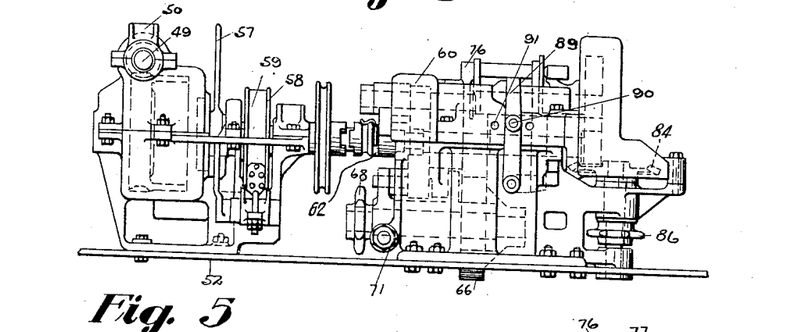
Fig. 5 is a side elevation of the transmission mechanism by which the truck propelling mechanism is actuated.
Figure 6:
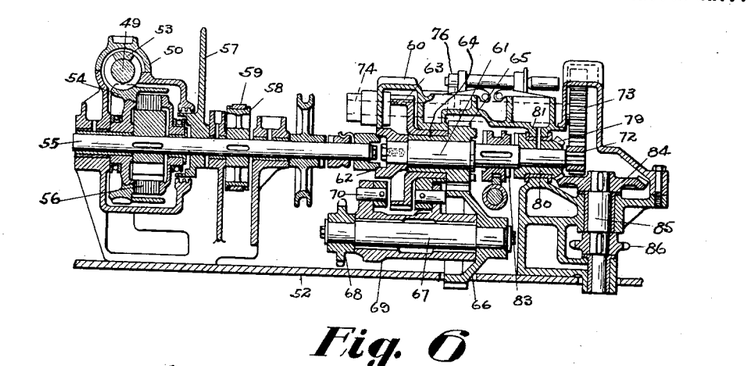
Fig. 6 is a section taken along the line VI—VI of Fig. 1, showing the transmission mechanism by which the truck propelling devices are actuated.

Projecting upwardly from the turn table 12 are four pedestals 16 in each of which is journaled a vertical screw shaft 17, and each screw shaft is fitted with a nut 18 in such manner that rotation of the screws will cause the nuts to move upward or downward in guideways of the pedestal. Resting upon these nuts 18 is a structural steel framework 19, hereinafter known as the supporting frame, having longitudinally extending angle bars 20 forming guideways adapted to receive and support a mining machine such as is illustrated in Fig. 1. Concentric with the axis of the turn table is a vertical shaft 21 having a sprocket 21' connected by an endless chain 22 with the power devices of the truck. At the upper end of the vertical shaft 21 is fixed a sprocket wheel 23 which engages an endless chain 24, and this endless chain 24 engages four sprocket wheels 25 one of which is mounted at the lower end of each of the upright screws above referred to. The sprocket wheels 25 are arranged to be connected with their respective screws 17 by convenient clutches 26 adapted to movement longitudinally of their respective screw shafts. Each clutch 26 is provided with a shifting yoke 27 attached to a vertically movable shaft 28 mounted in the machine frame, and each shaft 28 is provided with an operating handle 29 by which said shaft may be longitudinally moved or rotated. A pin 30 projecting from the shaft 28 is adapted to engage the upper surface of the truck frame to hold the clutch 26 out of engagement with the sprocket wheel 25, and a slot 31 is provided in the frame to receive the pin 30 and permit the clutch 26 to be dropped into engagement with its sprocket wheel. By the devices just described the supporting frame 19 may be vertically adjusted through parallel planes, or it may be tilted to planes inclined in any preferred direction relative to the horizontal plane of the turn table.

Removably attached to the forward end of the supporting frame 19, by means of the hinge members 32 and 33 and the longitudinally movable hinge pins 34, is an auxiliary guide frame 35 composed of angle bars similar to and in alignment with the guide bars 20 of the supporting frame. The auxiliary guide bars 35 are adapted to extend from the supporting frame to the mine floor, or to an elevated bench, to guide the mining machine from the supporting frame when it is desired to operate upon the mine floor, and upon which said mining machine may be returned to the supporting frame for use in combination with the carriage or for transportation from one working place to another. The auxiliary guide frame 35 may be removed from the carriage when not required for use by the withdrawal of the hinge pins 34 from engagement with the hinge members 32, and it may be conveniently replaced in working relation with the supporting frame by the proper adjustment of said hinge members.

At both sides of the machine frame 1 are upwardly projecting brackets 36 to which the feed rope of the mining machine may be attached to swing the turn table 12 relative to the truck frame, or to draw the mining machine along the guideways 35 and 20 into position upon the supporting frame. To each of these brackets 36 is attached a plurality of coupling links 37 adapted to form convenient connections for the feed rope at approximately the level of the guide sheaves 38 of the mining machine in any position of vertical adjustment of the machine supporting frame.

Fixed to the axle 3 is a brake drum 39 which is encircled by a brake band 40 connected by the toggle 41 and link 42 with a transverse shaft 43 mounted in suitable bearings upon the truck frame 1. To the shaft 43 is fixed a rocker arm 44 which is connected by a rod 45 with an operating lever 46, of well known design, adapted to be held in retracted position by a notched arc 47. By the manipulation of the lever 46 tension may be applied to the brake band 40 to exert a retarding force upon the brake drum 39 to resist rotation of the axle 3, and by engagement of the brake lever 46 with the notched arc 47 the tension upon the brake band may be maintained at the will of the operator.

Mounted upon the overhanging portion 11 of the truck frame 1 is an electric motor 48 which supplies power for the propulsion of the carriage and for the actuation of the auxiliary devices associated therewith. The armature shaft of the motor 48 is connected with a longitudinally extending shaft 49, journaled in bearings of the gear housing 50, by a pair of spur gears 51. The gear housing 50 is bolted to the floor plate 52 of the truck frame and the connection between the motor and the worm shaft affords the desirable flexibility between the power units, and permits the removal of either of these parts without disturbing the other. Formed upon the shaft 49 is a worm 53 which engages a worm wheel 54 mounted for free rotation upon the truck propelling shaft 55 which extends transversely of the truck frame, and is supported in journal bearings of the gear housing 50, the worm wheel 54 is arranged to be connected with the truck propelling shaft 55 by a suitable friction clutch 56 arranged to be controlled by a lever 57 adapted to rotary oscillation about the truck propelling shaft 55. A brake drum 58 fixed to the truck propelling shaft 55 is encircled by a brake band 59 the tension of which is controlled by movement of the lever 57 which also controls the friction clutch 56. The arrangement of these parts is such that movement of the lever 57 in one direction from its central neutral position causes the actuation of the clutch 56 to revolve the truck propelling shaft, and movement of said lever in the opposite direction, applies retarding force to the brake drum 58 to resist rotation of said shaft.

Attached to the floor plate 52 is a second gear housing 60 having suitable bearings in which is supported an extension shaft 61 in longitudinal alignment with the truck propelling shaft 55. The shafts 55 and 61 are operatively connected by a jaw clutch coupling 62 which affords a degree of flexibility very desirable in machinery of this class. Upon this extension shaft 61 is mounted for free rotation relative thereto, a spur gear 63 having an integral extension sleeve 64 to which is fixed a second spur gear 65. The gear 65 meshes with a spur gear 66 fixed to one end of a counter shaft 67, and to the other end of this counter shaft 67 there is fixed a sprocket wheel 68 which engages the truck propelling chain 10 to drive it. The counter shaft 67 is supported in parallelism with the extension shaft 61 in a sleeve bearing 69 which is suspended upon supporting pins 70 fixed to the gear housing, in such manner that the sprocket wheel 68 may be moved longitudinally of the truck frame to adjust the tension of the driving chain 10. Two oppositely disposed set screws 71 are screw threaded in suitable apertures of the gear housing casting to afford means for effecting the adjustment of the sleeves 69 and the tensioning of the chain 10.

Fixed to the outer end of the extension shaft 61 is a spur pinion 72 which engages a spur gear 73 fixed to the back gear shaft 74, supported in bearings of the gear housing and extending parallel with the shaft 61. A spur pinion 75 is mounted upon the back gear shaft 74 and is slidably connected therewith by a suitable feather key, and this pinion 75 is adapted to be moved into and out of engagement with the spur gear 63. Movement of the pinion 75 is controlled by the shifting yoke 76 fixed to the shaft 77 which is longitudinally slidable in apertures of the gear housing. A pin 78 projecting laterally from the shaft 77 affords a handle for the manipulation of the pinion 75.

Mounted upon the extension shaft 61 is a bevel pinion 79 formed integral with the sleeve 80 which extends through the journal bearing 81 of the gear housing, and upon the inner end of this sleeve 80 is formed a clutch member 82 adapted to engage with teeth formed on the outer face of the jaw clutch 83 when it is moved to its extreme right hand position. The bevel pinion 79 engages the bevel gear 84 fixed to the upper end of the vertical shaft 85 which is journaled in suitable bearings of the gear housing. To the vertical shaft 85 is fixed a sprocket wheel 86 which engages the driving chain 22 for the actuation of the vertical adjusting mechanism.

Movement of the jaw clutch 83 is controlled by the shifting yoke 87 attached to a shifting lever 88 which is pivotally supported in the gear housing 60. A controlling handle 89 attached to the shifting lever 88 and positioned outside of the gear housing 60, affords means for moving the clutch 83. A spring pressed dog 90 adapted to engage either of three apertures 91 in the gear housing casting, serves to hold the parts in either of three positions of adjustment. When the hand lever 89 is moved to its extreme left hand position the clutch 83 engages teeth formed on the face of the spur gear 65 to connect it directly with the shaft 61. When the hand lever 89 is in its extreme right hand position the clutch 83 engages the clutch member 82 to connect the bevel pinion 79 with the shaft 61, and when the operating lever is in its central position the clutch 83 is held out of engagement with either the spur gear or the bevel gear.

Figures 7, 8, 9, 10:
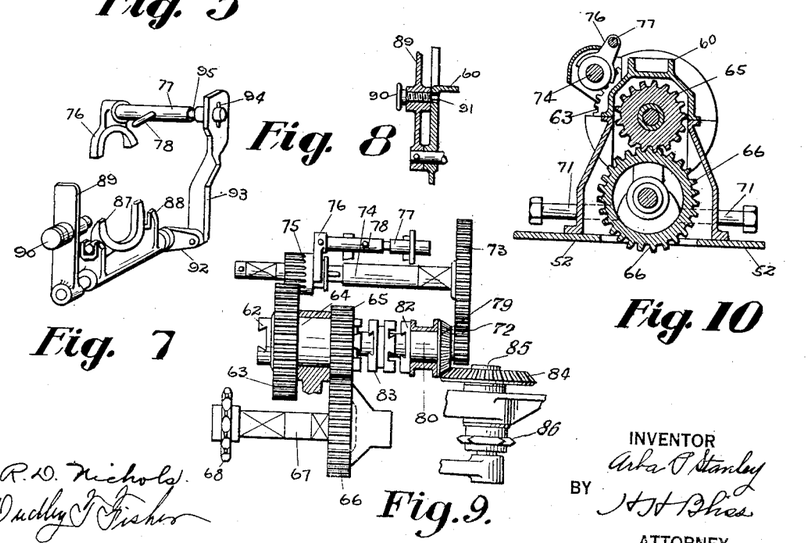
Figs. 7, 8, 9, and 10 are details of the truck actuating mechanism.
Figures 11, 13:
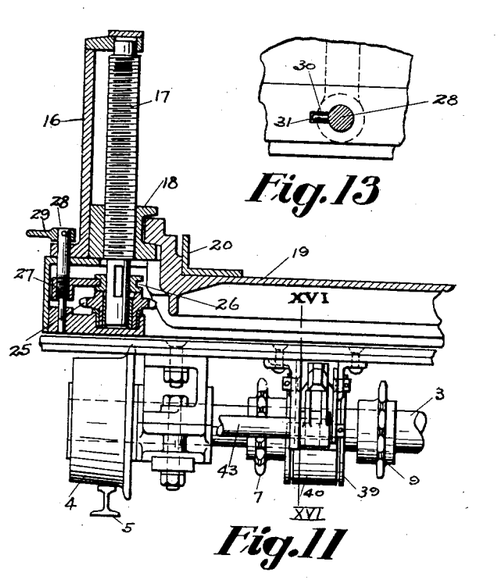
Fig. 11 is a fragmentary sectional view taken along the line XI—XI of Fig. 2.
Figs. 12 and 13 are enlarged details of some of the devices shown in Fig. 11.
Figure 12:
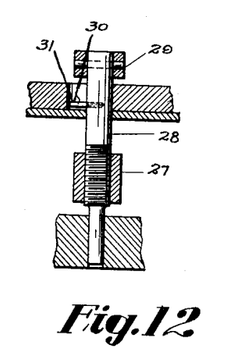
Figure 14:
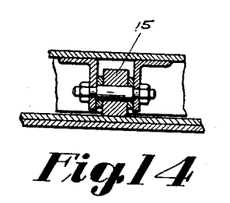
Fig. 14 is a section taken along the line XIV—XIV of Fig. 4.
Figure 15:
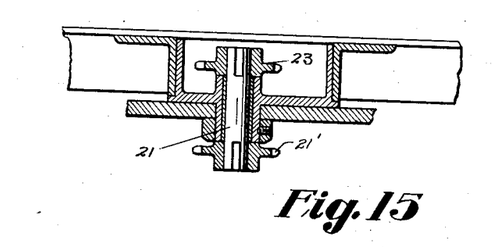
Fig. 15 is a sectional view taken along the line XV—XV of Fig. 2.
Figure 16:
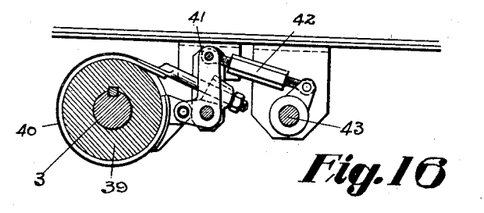
Fig. 16 is a sectional view taken along the line XVI—XVI of Fig. 11.

Formed on the clutch shifting lever 88 is a crank arm 92 to which is connected the upwardly projecting interlocking bar 93 at the upper end of which is provided an aperture 94 through which projects the shaft 77. Formed in the shaft 77 is a notch 95 adapted to register with the interlocking bar 93 when the pinion 75 is in its position of disengagement from the gear 63. The bar 93, when in the position shown in Figure 7, is held against vertical movement, this being the position of the parts in which the pinion 75 is in mesh with the gear 62, as shown in Figure 9. Under these conditions, it is obvious that the clutch fork 87 cannot be operated. When, however, the rod 77, clutch fork 76, and pinion 75 are moved to an inoperative position relative to the gear 63, the notch 95, in the shaft rod 77, will be in register with the aperture 94 in the bar 93, so as to permit vertical movement of this bar, and, under such conditions, the clutch fork 87 may be operated to throw the clutch 83 to engage either with the clutch element 82 or with the clutch teeth upon the gear 65". It is obvious that the bar 93 will interlock with the notch 95 under these conditions, so that the clutch bar 77 and the pinion 75 cannot be actuated.

By the arrangement of parts above described power may be transmitted from the motor 48 through the truck propelling shaft 55, clutch 56, spur gears 65 and 66, sprocket wheel 68, and chain 10 to propel the truck at a relatively high speed, or power may be transmitted through the truck propelling shaft 55, spur gears 72, 73, 75, and 63, to the spur gear 65, and through the gear 66, sprocket wheel 68, and chain 10, to propel the truck at a relatively low speed, and the interlocking mechanism is adapted to prevent the actuation of the gearing in antagonistic combinations.

Electric controlling devices are provided upon the truck for the control of the motor 48 whereby the motor may be actuated in either direction and at a choice of several speeds, and suitable fuses are provided for the protection of the apparatus in case of excessive flow of electricity through the circuits. As such devices are well known in the art, and as they form no part in the present invention, further description and illustration is not thought to be required.

Figure 22:
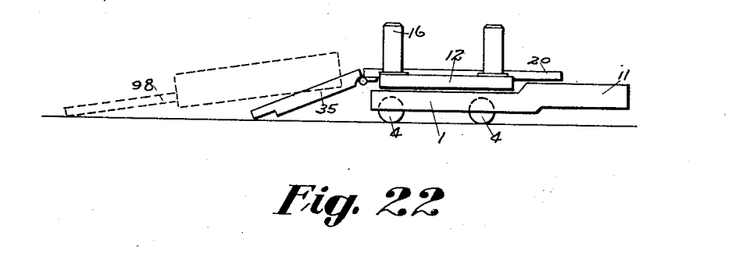

When the mining machine is used in either the longwall or shortwall system of mining the carriage is advanced along the mine track 5 into suitable proximity with the coal face, the auxiliary guideway 35 is adjusted in operative position, and the mining machine is slid along the guideway 20 and the auxiliary guideway 35 to the mine floor, as illustrated in Fig. 22. After the completion of the cutting operation the turn table may be rotated so that the guideways will extend towards the mining machine upon the mine floor, and the feed rope 96 attached to the abutment 36 upon the truck. By manipulation of the feeding mechanism the winding drums 96a will be actuated to wind the rope 96 to draw the machine along the auxiliary guideway 35 and the guideway 20 to its traveling position upon the supporting frame.

Figure 21:
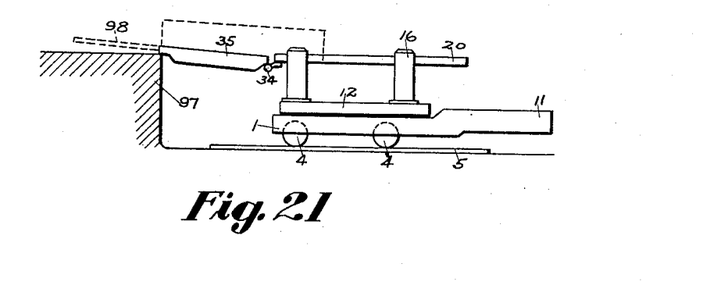

In the recovery of coal from very thin veins it is the common practice to take up bottom material to form roadways of sufficient height for the convenient passage of the miners and of the cars by which the coal is transported from the mine. In such a mine the carriage will be advanced along the mine track to a position conveniently near to the place of operation, the auxiliary guide frame 35 will be adjusted to extend between the supporting frame 19 and the bench 97 of the mine floor, and the mining machine drawn along the guideway 20 and auxiliary guideway 35, as illustrated in Fig. 21.

The above described apparatus is especially adapted to use in the arcwall system of mining wherein the coal cutting operation is performed while the mining machine is supported upon the truck and the truck supported upon a track extending towards the coal face. The kerf thus formed is necessarily positioned at a considerable distance above the mine floor, and it is the usual practice to so vertically adjust the supporting frame 19 that bands of impurities occurring in the coal vein may be removed by the cutting.

Figure 17:
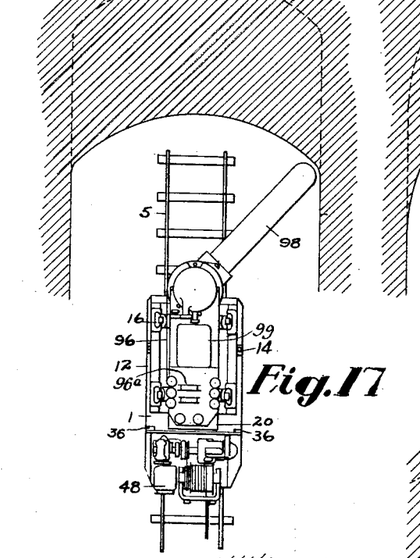
Figs. 17 to 22 are diagrams illustrating some of the methods of operating the apparatus.

In Fig. 17, there is illustrated a method of cutting at the end of an entry, or other narrow working. As here illustrated the track 5 is positioned along the center line of the entry and extends near to the coal face. As the machine approaches the coal face the cutter arm 98 is swung about its pivot until its inner end contacts with the right hand rib, and is locked in that position. The carriage is then advanced until the end of the cutter bar contacts with the coal face after which the motor 99 will be started to actuate the cutting mechanism, and the carriage advanced by the tractive effort of its wheels actuated through the low speed gearing of the truck propelling mechanism. When the cutter arm has been forced into the coal to its full effective depths, the carriage will be held against further movement by the brake mechanism 39, the cutter arm unlocked to permit rotation, the feed rope 96 adjusted and attached to the cutter arm, and the feeding mechanism manipulated to cause the rotation of the cutter arm to cut the kerf in the mine wall across the end of the entry. When the kerf has been cut to the line of the left hand rib the cutter arm will be again locked against rotation and the carriage moved away from the coal face to finish the cut.

Figure 18:
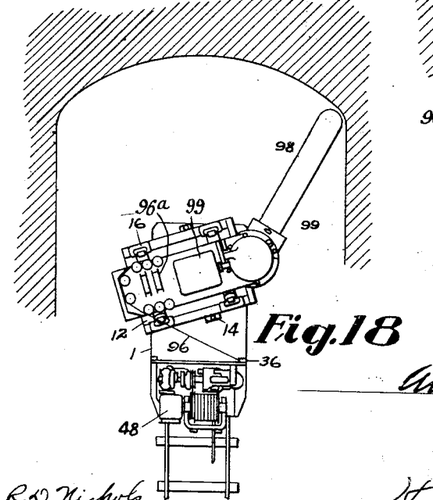

In Fig. 18 there is illustrated a method of cutting in a working of somewhat greater width than can be produced by the method illustrated in Fig. 17. As here illustrated when the machine has been brought to the working place the turn table 12 is rotated about its pivot to a suitable angle and locked in that position. The cutter arm 98 is rotated about its pivot to bring its inner end to a point upon the coal face at which the cutting is to begin, and is locked in that position. The machine is then advanced by the tractive effort of its wheels to force the cutter arm 98 longitudinally into the coal. After the cutter arm has been fully sumped, the feed rope 96 is passed around the guide sheaves 38 of the mining machine and attached to the bracket 36 at the right hand side of the carriage. The locking bolt 14 of the turn table is then disengaged and the rope 96 wound upon its winding drum to swing the turn table about its pivot, causing the cutter arm to form a kerf in the mine wall across the end of the entry. When the cutter arm has advanced to the line of the left hand rib the locking pin 99 is withdrawn to permit the cutter arm to swing about its pivot, and rotation of the turn table 12 is continued until the cutter arm assumes an angular position similar to that at which the cutting was commenced upon the right hand side. The machine is then backed away from the face to complete the cut.

Figure 19:
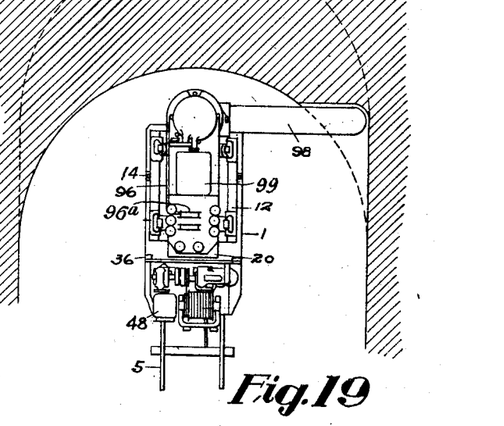

In Fig. 19, there is shown a method of cutting in a mine room the width of which is equal to twice the length of the cutter arm. In such case the track is positioned along the center line of the room, the machine is advanced to suitable relation with the coal face, the cutter arm extending at right angles towards the right hand rib. The feed rope 96 is then adjusted in connection with the cutter arm and the feeding mechanism is manipulated to swing the cutter arm to an arc of 180 degrees, cutting a semicircular kerf across the end of the mine room.

Figure 20:
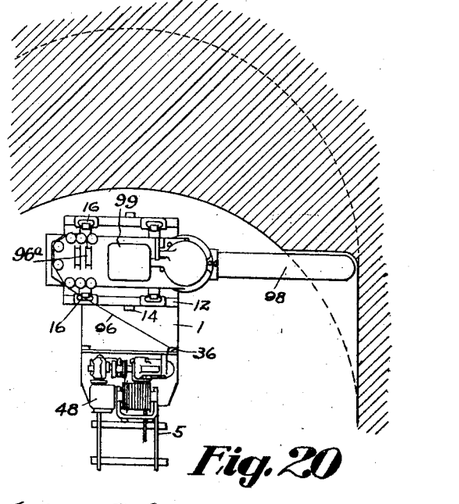

Fig. 20 shows a method of cutting a room somewhat wider than that shown in Fig. 19. In this case the arrangement of the room and mining apparatus is similar to that shown in Fig. 19, but the cutting mechanism is rotated about the pivot of the turn table, thereby increasing its effective radius of operation, and by adjustment of the mining machine longitudinally of the supporting frame 19 this radius of operation may be still further increased.

What I claim is:—

1. In mining apparatus, the combination of a wheeled carriage, a motor mounted thereon and adapted to drive said carriage along suitable trackways, a turn table mounted on said carriage, a supporting frame mounted on said turn table and having longitudinal guideways projecting outside of the area of said turn table and adapted to receive a mining machine, and means actuated by said carriage motor to adjust vertically said supporting frame relative to said turn table.

2. In mining apparatus, the combination of a wheeled carriage, a motor mounted thereon and adapted to drive said carriage along suitable trackways, a turn table mounted on said carriage, a vertical shaft on which said turn table is rotatably mounted, a drive connection from said carriage motor to said vertical shaft, a supporting frame mounted on said turn table and having longitudinal guideways projecting beyond the area of said turn table and adapted to receive a mining machine, means to adjust vertically said supporting frame relative to said turn table, and actuating connections between said vertical shaft and said adjusting means.

3. In mining apparatus, the combination of a wheeled carriage, a motor mounted thereon and adapted to drive said carriage along suitable trackways, a turn table mounted on said carriage, a vertical shaft on which said turn table is rotatably mounted, a drive connection from said carriage motor to said vertical shaft, a supporting frame mounted on said turn table and having longitudinal guideways projecting beyond the area of said turn table and adapted to receive a mining machine, a plurality of means to adjust vertically said supporting frame relative to said turn table, actuating connections between said vertical shaft and said adjusting means for simultaneous operation of said adjusting means, and means for intermitting the action of any of said adjusting means.

4. In a mining apparatus, the combination with a wheel supported track guided carriage, a motor upon the carriage connected and arranged to actuate the supporting wheels to propel the carriage along the track rails, a supplemental frame mounted upon the carriage and adapted to rotary movement about a vertical axis within the wheel base of the carriage, a machine supporting frame mounted upon the supplemental frame and comprising longitudinally extending guideways adapted to receive a mining machine and support it above the track wheels, means actuated by said carriage motor and operable in any position of angular adjustment of said supplemental frame to vertically adjust said supporting frame relative to said supplemental frame, a mining machine removably supported upon and longitudinally slidable in said supporting frame, said mining machine comprising a main frame, an elongated kerf cutter pivotally attached to the forward end of said main frame and adapted to project horizontally at either side thereof and to be swung in horizontal planes across the end of the machine to engage the coal to cut it, a motor upon the mining machine to actuate the kerf cutter, and feeding devices upon the main frame of the mining machine and actuated by the mining machine motor adapted to cooperate with suitable abutments upon the machine or remote therefrom to swing the kerf cutter, to bodily slide the mining machine, and to rotate the supplemental frame as and for the purpose set forth.

5. In a mining apparatus, the combination with a wheel supported track guided carriage, a motor mounted upon the carriage connected and arranged to actuate the supporting wheels to propel the carriage along the track rails, a suppemental frame mounted upon the carriage and adapted to rotary movement about a vertical axis within the wheel base of the carriage, means to lock the supplemental frame in any preferred position of angular adjustment relative to the carriage, a machine supporting frame mounted upon the supplemental frame and comprising longitudinally extending guideways adapted to receive a mining machine and support it above the track wheels, means actuated by said carriage motor and operable in any position of angular adjustment of said supplemental frame to vertically adjust said supporting frame relative to said supplemental frame, a mining machine removably supported upon and longitudinally slidable in said supporting frame, said mining machine comprising a main frame, an elongated kerf cutter pivotally attached to the forward end of said main frame and adapted to project horizontally at either side thereof and to be swung in horizontal planes across the end of the machine to engage the coal to cut it, means to lock said kerf cutter in any preferred position of angular adjustment relative to said main frame, a motor upon the mining machine to actuate the kerf cutter, and feeding devices mounted upon the main frame of the mining machine and actuated by the mining machine motor adapted to cooperate with suitable abutments upon the machine or remote therefrom, to swing the kerf cutter, to bodily slide the mining machine and to rotate the supplemental frame as and for the purpose set forth.

6. In a mining apparatus, the combination with a wheel supported track guided carriage, a motor upon the carriage connected and arranged to actuate the supporting wheels to propel the carriage along the track rails, a supplemental frame mounted upon the carriage and adapted to rotary movement about a vertical axis within the wheel base of the carriage, a machine supporting frame mounted upon the supplemental frame and comprising longitudinally extending guideways adapted to receive a mining machine and support it above the track wheels, means actuated by said carriage motor and operable in any position of angular adjustment of said supplemental frame to vertically adjust said supporting frame relative to said supplemental frame, a mining machine removably supported upon and longitudinally slidable in said supporting frame, said mining machine comprising a main frame, an elongated kerf cutter pivotally attached to the forward end of said main frame and adapted to project horizontally at either side thereof and to be swung in horizontal planes across the end of the machine to engage the coal to cut it, a motor upon the mining machine to actuate the kerf cutter, and feeding devices upon the main frame of the mining machine and actuated by the mining machine motor comprising a flexible draft member adapted to be connected to suitable abutments upon the machine or external thereof, an abutment upon the carriage frame adapted to cooperate with said draft member to rotate the supplemental frame, and an abutment connected with the kerf cutter adapted to connection with the draft member to swing said kerf cutter as and for the purpose set forth.

7. In a mining apparatus, the combination with a wheel supported track guided carriage, a motor upon the carriage connected and arranged to actuate the supporting wheels to propel the apparatus along the rails, a supplemental frame mounted upon the carriage and adapted to rotary movement about a vertical axis within the wheel base of the carriage, means to load the supplemental frame in any preferred position of angular adjustment, a machine supporting frame mounted upon the supplemental frame and comprising longitudinally extending guideways adapted to receive a mining machine and support it above the track wheels, and means actuated by said carriage motor operable in any position of angular adjustment of said supplemental frame to vertically adjust said supporting frame relative to said supplemental frame, a mining machine removably supported upon and slidable in said supporting frame, said mining machine comprising a main frame, an elongated kerf cutter pivotally attached to the forward end of said main frame and adapted to project horizontally at either side thereof and to be swung in horizontal planes across the end of the machine to engage the coal to cut it, a motor upon the mining machine to actuate the kerf cutter, and feeding devices upon the main frame of the mining machine and actuated by the mining machine motor comprising a draft member adapted to be connected to an abutment upon the machine or external thereof to rotate the kerf cutter, to bodily move the mining machine and to rotate the supporting frame as and for the purpose set forth.

8. In a mining apparatus, the combination with a wheel supported track guided carriage, of a motor mounted upon the carriage connected and arranged to actuate the supporting wheels to propel the apparatus along the track rails, a supplemental frame mounted upon the carriage adapted to rotary movement about a vertical axis within the wheel base of the carriage, an auxiliary frame mounted upon the supplemental frame and adapted to vertical adjustment relative thereto, means actuated by the carriage motor to effect the vertical adjustment of the auxiliary frame, and guideways upon the auxiliary frame adapted to guide a mining machine from the carriage to the mine floor and from the mine floor to the carriage and to support said mining machine above the supporting wheels in operative relation with the coal face to cut a kerf therein as and for the purpose set forth.

9. In a mining apparatus, the combination with a wheel supported track guided carriage, of a motor mounted upon the carriage connected and arranged to actuate the supporting wheels to propel the apparatus along the track rails, a supplemental frame mounted upon the carriage adapted to rotary movement about a vertical axis within the wheel base of the carriage, an auxiliary frame mounted upon the supplemental frame and adapted to vertical adjustment relative thereto, means actuated by the carriage motor and operable in any position of angular adjustment of the supplemental frame to effect the vertical adjustment of the auxiliary frame, and guideways upon the auxiliary frame adapted to guide a mining machine from the carriage to the mine floor and from the mine floor to the carriage and to support said mining machine above the supporting wheels in operative relation with the coal face to cut a kerf therein as and for the purpose set forth.

10. In a mining apparatus, the combination with a wheel supported track guided carriage, of a motor mounted upon the carriage connected and arranged to actuate the supporting wheels to propel the apparatus along the track rails, a supplemental frame mounted upon the carriage and adapted to rotary movement about a vertical axis within the wheel base of the carriage, a machine frame supported upon the supplemental frame and adapted to vertical adjustment relative thereto, means actuated by the carriage motor to effect the vertical adjustment of the machine frame, an elongated kerf cutter projecting horizontally from the machine frame, and means upon the machine frame to actuate the kerf cutter and to rotate the supplemental frame as and for the purpose set forth.

11. In a mining apparatus, the combination with a wheel supported track guided carriage, of a motor mounted upon the carriage connected and arranged to actuate the supporting wheels to propel the apparatus along the track rails, a supplemental frame mounted upon the carriage and adapted to rotary movement about an axis within the wheel base of the carriage, a machine frame mounted upon the supplemental frame and adapted to vertical adjustment relative thereto, means actuated by the carriage motor to effect the vertical adjustment of the machine frame, an elongated kerf cutter pivotally supported upon the machine frame and adapted to rotary movement about a vertical axis outside the bounding planes of the carriage, and means upon the machine frame to actuate the kerf cutter, to rotate the kerf cutter and to rotate the supplemental frame as and for the purpose set forth.

12. In mining apparatus, the combination of a wheeled carriage, a motor thereon and adapted to drive said carriage along suitable trackways, a supporting frame mounted on said carriage and angularly adjustable relative thereto, a vertically adjustable supplemental frame on the supporting frame, a mining machine on said supplemental frame and adapted to move thereon to and from the mine floor, means for swinging said supporting frame, means actuated by said carriage motor to adjust said supplemental frame vertically and bring said mining machine into operative relation to the coal face at points above the mine floor, and means to prevent motor operation of said carriage along its trackways during vertical adjustment of said supplemental frame.

13. In mining apparatus, an underframe, a platform supported thereabove for swinging movement about a vertical shaft, a kerf cutting device carried by said platform, means for vertically displacing said platform relative to said underframe, and means for driving said displacing means from said shaft.

14. In mining apparatus, an underframe, a platform supported thereabove for swinging movement about a vertical shaft, a kerf cutting device carried on said platform, a plurality of means adapted to act on said platform at spaced points for vertically displacing same, and means for driving said displacing means from said shaft.

15. In mining apparatus, an underframe, a platform supported thereabove for swinging movement about a vertical shaft, a kerf cutting device carried on said platform, a plurality of means adapted to act on said platform at spaced points for vertically displacing same, and means for selectively driving said displacing means from said shaft.

16. In mining apparatus, a base element adapted to be moved over a mine floor, a support on said base element pivotal relative thereto about a vertical axis, motor operated means for elevating and universally tilting the support, a cutter bar in connection with said support and pivotal relative to the latter about a vertical axis horizontally spaced from said first-mentioned axis, a motor, power transmission means driven by said motor and common to both the support and cutter bar for swinging the support relative to the base element with the cutter bar in fixed angular relation to the support and for swinging the cutter bar relative to the support with the latter in fixed angular relation to the base element, means independent of said power transmission means operable to lock the cutter bar in fixed angular relation to the support, and means independent of said power transmission means operable to lock the support in fixed angular relation to the base element.

17. In a machine of the class described, a base element adapted to be moved over a mine floor, a turn table mounted on said base element and pivotal relative thereto on a vertical axis, motor operated means for elevating and universally tilting the support, a cutter bar supported on said turn table for pivotal movement on a vertical axis spaced horizontally from said first-mentioned axis, a motor, and power transmission means driven by said motor and common to both the turn table and cutter bar for swinging the turn table relative to the base element with the cutter bar in fixed angular relation to the support and for swinging the cutter bar relative to the support with the latter in fixed angular relation to the base element.

18. In a device of the class described, a base element adapted to be moved over a mine floor, a turn table mounted on said base element and pivotal relative thereto on a vertical axis, motor operated means for elevating and universally tilting the support, a cutter bar supported on said turn table for pivotal movement on a vertical axis spaced horizontally from said first-mentioned axis, a motor on the turn table, and shiftable power transmitting means driven by said motor and being common to both the cutter bar and turn table for selectively swinging the turn table relative to the base element with the cutter bar in fixed angular relation to the support and for swinging the cutter bar relative to the support with the latter in fixed angular relation to the base element.

19. In mining apparatus, a base element adapted to be moved over a mine floor, a support on said base element pivotal relative thereto about a vertical axis, a cutter bar in connection with said support and pivotal relative to the latter about a vertical axis horizontally spaced from said first mentioned axis, motor operated means for elevating and universally tilting the support, self-contained motor driven means for swinging the support relative to the base element with the cutter bar in fixed angular relation to the support and for swinging the cutter bar relative to the support with the latter in fixed angular relation to the base element, a locking pin operable to lock the cutter bar in fixed angular relation to the support, and a second locking pin operable to lock the support in fixed angular relation to the base element.

20. In mining apparatus, the combination with a truck adapted to travel along a mine track, of a carrier pivotally mounted thereon, a unitary separately operable mining machine mounted on said carrier and comprising a pivoted cutter bar, self-contained power-operated mechanism for swinging said cutter bar on its pivot or said mining machine as a whole by swinging said carrier, means other than said swinging mechanism for preventing said cutter bar from swinging on its pivot when said mining machine as a whole is swung, means for preventing swinging of said carrier when said cutter bar is swung on its pivot, and means for moving the truck along the mine track at a feeding speed.

21. In mining apparatus, the combination with a truck adapted to travel along a mine track, of a carrier pivotally mounted thereon, a unitary separately operable machine mounted on said carrier and comprising a pivoted cutter bar and feeding rope gearing, means for holding the carrier against swinging when the cutter bar is swung on its pivot, means for holding the cutter bar against swinging on its pivot when the carrier is swung together with the mining machine relatively to the truck, an anchorage on the cutter bar for rendering said rope gear operable to swing the cutter bar on its pivot when the carrier is held as aforesaid, and an anchorage on the truck for rendering said rope gearing operable to swing the carrier and mining machine on the upright axis of said carrier while the cutter bar is held against turning on its pivot.

22. In mining apparatus, the combination with a portable supporting frame, of a carrier pivotally mounted thereon, a unitary separately operable mining machine detachably mounted thereon and comprising rope gearing for sliding the machine over a mine floor to feed the pivoted cutter bar thereof, releasable means for holding the carrier against turning, an anchorage on the cutter bar for rendering said rope gearing operable to swing the cutter bar on its pivot, and an anchorage on the truck for rendering said rope gearing operable to swing the carrier and the mining machine relatively to the truck.

23. In a mining machine, the combination with a truck adapted to travel on a mine track, of a carrier pivotally mounted thereon, releasable means for holding said carrier against turning relatively to the truck, a unitary separately operable mining machine detachably mounted on said carrier and of the type adapted to slide on its bottom during operation by means of rope gearing constituting a part of such mining machine, the latter comprising a pivoted cutter bar with releasable means for holding the cutter bar against turning on its pivot, and an anchorage on the cutter bar for rendering said rope gearing operable to swing the cutter bar on its pivot to effect cutting when the mining machine is mounted on said carrier, an anchorage on the truck for rendering said rope gearing operable to swing the carrier to effect feeding of the cutter bar on the axis of said carrier while the cutter bar is held against turning on its pivot, and traction feeding mechanism for moving the whole mining machine rectilinearly to effect rectilinear cuts parallel to the mine track while both of said holding means prevent swinging of the cutter bar relatively to the truck.

24. In mining apparatus, the combination with a truck adapted to travel along a mine track, of a carrier mounted thereon, a unitary separately operable mining machine detachably mounted on said carrier and comprising an elongated chain kerf-cutter and means for imparting a swinging feeding movement thereto, while said truck remains stationary on the mine track, means for locking the kerf-cutter in an adjusted angular position relative to the truck, and traction feeding mechanism mounted on the truck to effect rectilinear feed of said kerf-cutter while locked in such angular position.

25. In mining apparatus, the combination with a truck adapted to travel along a mine track, of a carrier mounted thereon, a unitary separately operable mining machine detachably mounted on said carrier and comprising an elongated pivoted kerf-cutter and means for effecting arcuate feeding movement thereof while the truck remains stationary on the mine track, and truck propelling mechanism mounted on the truck.

26. In mining apparatus, the combination with a truck adapted to travel along a mine track, of a turntable pivoted thereto to swing on an upright axis, a mining machine removably mounted on said turntable to swing therewith on said upright axis, means for locking said turntable in adjusted angular relation to said truck, self-contained power-operated feeding mechanism for said truck and mining machine while said turntable is locked in such angular position, and self-contained power-operated mechanism for swinging said turntable when released relatively to said truck while the latter is stationary.

27. In mining apparatus, the combination with a unitary mining machine of the type normally slidable over the mine floor during operation and comprising an elongated cutter bar and means for feeding the machine during cutting, of a wheeled truck, means for securing said mining machine to said truck, and means comprising a manually controlled friction clutch for effecting slow feeding movement of said mining machine by propelling said truck at a predetermined slow speed independently of said first-named means.

28. In universal mining apparatus, the combination with a unitary mining machine of the type normally adapted to slide over a mine floor during operation and comprising a pivoted cutter bar and means for holding the same at any one of various adjusted angles and feed gearing having a flexible member connectible to said bar to effect swinging feeding movement thereof, of a wheeled truck, means for detachably securing said mining machine to said truck, and truck propelling mechanism operable independently of the said feed gearing to effect movement of the combined truck at the slow feeding speed of the mining machine while said cutter bar is locked at an adjusted angle for rectilinear movement parallel to the path of movement of the truck.

29. In mining apparatus, the combination with a unitary mining machine of the type adapted to slide over a mine floor during operation and comprising a pivoted cutter bar and feed gearing comprising a flexible draft member adapted to be connected to the cutter bar to swing it or to an anchorage extraneous to the mining machine to effect bodily movement thereof, of a wheeled truck, means securing said mining machine to said truck in such position as to permit swinging movement of said cutter bar relatively to the truck, truck propelling mechanism comprising a motor on the truck, and means for controlling said propelling mechanism independently of the mining machine to move the combined truck and mining machine at the feeding speed of the mining machine or at the transport speed of the truck.

30. In mining apparatus, the combination with a truck adapted to travel along a mine track, of a carrier pivoted to said truck on an upright axis, a unitary separately operable mining machine detachably mounted on said carrier to rotate bodily therewith, self-contained power-operated means for rotating said carrier to effect arcuate swinging feeding movement of said mining machine while said truck is stationary, means for locking said carrier in adjusted angular position, and self-contained power-operated traction mechanism for the truck to effect feeding movement of said mining machine along rectilinear lines parallel to the mine track.

31. In mining apparatus, the combination with a truck adapted to travel along a mine track, of a carrier mounted thereon, a unitary separately operable mining machine detachably mounted on said carrier and comprising an elongated kerf-cutter and self-contained power-operated means for imparting a swinging feeding movement thereto while said truck remains stationary on the mine track, means for locking the kerf-cutter in an adjusted angular position relative to the truck, and self-contained power-operated traction feeding mechanism to effect rectilinear feed of said kerf-cutter while locked in such angular position.

32. In mining apparatus, the combination with a truck adapted to travel along a mine track, of a carrier mounted thereon, a unitary separately operable mining machine detachably mounted on said carrier and comprising a frame with an elongated kerf-cutter pivoted thereto and means for effecting arcuate feeding movement of the kerf-cutter relatively to said frame while said truck remains stationary on the mine track, and truck propelling mechanism mounted on the truck for operation independently of said mining machine.

33. In mining apparatus, the combination with a truck adapted to travel along a mine track, of a carrier pivoted to said truck on an upright axis, a unitary separately operable mining machine detachably mounted on said carrier to rotate bodily therewith, self-contained power-operated means for rotating said carrier to effect arcuate swinging feeding movement of said mining machine while said truck is stationary, means for holding said carrier in adjusted angular position, and self-contained power-operated traction mechanism for effecting feeding movement of said mining machine along rectilinear lines parallel to the mine track.

34. In mining apparatus, the combination with a truck adapted to travel along a mine track, of a carrier pivoted thereon to rotate relatively thereto on an upright axis, a unitary separately operable mining machine detachably mounted on said carrier, and self-contained power-operated mechanism for effecting arcuate feeding movement of said mining machine while said truck is stationary.

35. In mining apparatus, the combination with a truck adapted to travel on a mine track, of a carrier pivoted thereto to rotate on an upright axis, a unitary separately operable mining machine detachably mounted on said carrier to move bodily therewith, said mining machine comprising kerf-cutting mechanism, self-contained power-operated mechanism for effecting swinging feeding movement of said kerf-cutting mechanism, and self-contained power-operated mechanism for effecting rectilinear feeding movement of said kerf-cutting mechanism.

36. In mining apparatus, the combination with a truck adapted to travel on a mine track, of a carrier pivoted thereto for rotation on an upright axis, a unitary separately operable mining machine comprising rope gearing extending from the rear end thereof to an anchorage on the truck to effect swinging feeding movement of the mining machine, and propelling mechanism mounted on the truck.

37. In mining apparatus, the combination with a truck adapted to travel on a mine track, of a carrier pivoted thereto to swing on an upright axis, a unitary separately operable mining machine comprising an elongated kerf-cutter pivotally mounted on a supporting frame to swing on an upright axis relatively to said frame and comprising also rope gearing adapted to feed said kerf-cutter over a mine floor when operating independently of said truck, said mining machine being detachably mounted on said carrier, means for locking said kerf-cutter at an adjusted angle relative to said frame, and an anchorage on the truck adapted to have connected thereto the rope of said rope gearing to effect swinging feeding movement of the kerf-cutter while locked at its adjusted angle.

38. In mining apparatus, the combination with a truck adapted to travel on a mine track, of a carrier pivoted thereto to swing on an upright axis, a unitary separately operable mining machine detachably mounted on said carrier and comprising rope gearing for slidably feeding the mining machine over a mine floor when operated independently of said truck, said mining machine also comprising a pivoted cutter bar and means for holding the same at an adjusted angle during cutting, an anchorage on the truck adapted to have said rope gearing connected thereto to swing the carrier with the mining machine thereon, an anchorage on the cutter bar adapted to have said rope gearing connected thereto to swing the cutter bar on its pivot, means to hold the carrier stationary while said cutter bar is fed on its pivot, and traction feeding mechanism for the truck with the mining machine thereon and the cutter bar in position to effect rectilinear cuts parallel to the mine track.

39. In a mining apparatus, the combination with a transport truck having means adapted to receive a mining machine, of a unitary separately operable mining machine of the type adapted to normally slide over a mine floor during cutting and support such mining machine on said truck, said mining machine including a pivoted cutter bar and a motor for driving the same, and self-contained mechanism on said truck entirely separate from the mining machine and mounted independently of the latter on the truck for driving the truck wheels at a predetermined slow cutting speed.

40. In mining apparatus, the combination with a unitary mining machine of the type normally slidable over a mine bottom during operation, said mining machine including a horizontally swinging cutter bar pivoted thereon and adapted to be swung by power and be held in various adjusted positions, of a wheeled truck, means for securing said unitary mining machine to said truck to move bodily therewith, and truck driving means for effecting slow feeding movement of said cutter bar and comprising a truck wheel driving train including a friction device, said truck driving means being manually controllable to control the truck movement as desired.

41. In mining apparatus, the combination with a unitary mining machine of the type normally slidable over a mine bottom during operation, said mining machine including a horizontally swinging cutter bar pivoted thereon and adapted to be swung by power and be held in various adjusted positions, a wheeled truck, means for securing said unitary mining machine to said truck to move bodily therewith, while permitting free swinging feeding movement of the cutter bar relatively to the truck, and truck driving means comprising a truck wheel driving train including a manually controllable friction device, said truck driving means being operative to control the truck speed as desired to produce a predetermined slow cutting speed when said cutter bar is held in an adjusted position or to produce a high transport speed for the truck.

42. In mining apparatus, the combination with a unitary mining machine adapted to slide over a mine floor during operation, said machine having a horizontally swinging cutter bar pivoted thereon and adapted to be swung by power and held in various adjusted positions, a flexible feeding member connectible to said cutter bar to effect swinging feeding movement thereof or to an extraneous abutment to effect bodily feeding movement of the machine, and feeding mechanism for drawing in said flexible member, a wheeled truck, means for securing said mining machine to said truck to move bodily therewith while permitting free swinging feeding movement of the cutter bar relatively to the truck, and truck driving means effecting movement of the truck with the mining machine secured thereto along a mine track at various speeds including a predetermined slow cutting speed, said truck driving means comprising a truck wheel driving train including a driving gear train and a friction clutch, both extraneous to the feeding mechanism of said mining machine, said friction clutch being manually controllable to control the truck speed as desired.

43. In mining apparatus, the combination with a unitary mining machine of the type normally slidable over a mine floor during operation, said mining machine having a horizontally swinging cutter bar pivoted thereon and adapted to be swung by power and held in various adjusted positions, a flexible feeding member connectible to the cutter bar for swinging feeding movement thereof or to an extraneous abutment to effect bodily feeding movement of the machine, and feeding mechanism for drawing in said flexible member, a wheeled truck, means for securing said mining machine to said truck while permitting free swinging of said cutter bar, and truck driving means comprising a truck wheel driving train extraneous to the mining machine including its said feeding mechanism and normally operable to produce a high transport speed or a predetermined cutting speed of said truck and including a manually controllable friction clutch.

44. In mining apparatus, the combination with a unitary mining machine of the type normally slidable over a mine floor during operation, said mining machine having a horizontally swinging cutter bar pivoted thereon and adapted to be swung by power and held in various adjusted positions, said unitary machine also having mechanism adapted to swing said bar and feed the same bodily when said machine is on the mine bottom, a wheeled truck, means for securing said mining machine to said truck without interfering with the free swinging of the cutter bar during cutting from the truck, and truck driving means for effecting movement of the combined truck and mining machine along a trackway at different speeds including a predetermined slow cutting speed and comprising a truck wheel driving train including a supplemental manually controllable friction clutch extraneous to the mining machine, said truck driving means being controllable to control the truck speed as desired.

45. In mining apparatus, the combination with a unitary mining machine of the type adapted to slide over a mine floor during operation, said machine having a pivoted cutter bar swingable by power in a horizontal plane, a power driven feed operating member, and a flexible member adapted to be drawn in thereby and connectible to said cutter to effect swing thereof, of a wheeled truck, means for securing said machine to said truck in such position as to permit free swinging of said cutter bar across the end thereof, and truck wheel driving mechanism operable independently of the said mining machine and including a manually controllable friction clutch on the truck to effect longitudinal movement of the combined truck and mining machine at a predetermined slow cutting speed or a fast transport speed.

46. In mining apparatus, the combination with a unitary mining machine of the type normally slidable over a mine floor during operation, said machine having a pivoted cutter bar swingable in a horizontal plane and having provision for being held in opposite acute angled positions relative to the machine, a power driven feed operating member, and a flexible member adapted to be actuated by the latter and connectible to said bar to effect swing thereof, a wheeled truck, means for securing said mining machine to said truck in such position as to permit free swinging of said bar relatively to the end thereof, and truck wheel driving mechanism for effecting movement of the combined mining machine and truck along a trackway at various speeds including a predetermined slow cutting speed and comprising a friction clutch to control the track movement, said clutch being mounted on the truck externally of said machine.

47. In mining apparatus, the combination with a unitary mining machine of the type normally adapted to slide over a mine floor during operation, said machine comprising a pivoted cutter bar swingable in a horizontal plane and adapted to be held in opposite acute angled positions relative to the machine, a power driven feed operating member, and a rope adapted to be drawn in thereby and connectible to said bar to effect swing thereof, of a wheeled truck, means for securing said machine unit to said truck in such position as to permit free swinging of said bar relatively to the end thereof, and truck wheel driving mechanism for effecting movement of the apparatus along the trackway at different speeds including a predetermined slow cutting speed and comprising a train separate from the driving train for said feed operating member, including a manually controllable friction device to control the rate of truck movement, said friction device being carried on said truck externally of said machine.

48. In mining apparatus, the combination with a unitary mining machine of the type normally slidable on the mine floor during operation, said machine having a pivoted cutter bar adapted to be swung about its pivot in a horizontal plane and held in opposite acute angled positions relative to the machine, a power driven feed operating member, a rope actuated by the latter and connectible at will to said bar to effect moving thereof or to an external abutment to effect bodily feeding movement of the machine, a wheeled truck to which the machine unit is fixed in such position as to permit free swinging of said bar across the end thereof, and truck wheel driving mechanism comprising a train separate from the driving train for said feed operating member and including a manually controllable friction device to obtain a predetermined slow cutting speed or a fast transport speed of said truck, said friction device being carried on said truck externally of said machine and being operatively connected through a flexible connection to said truck wheels.

49. In mining apparatus, the combination with a unitary mining machine of the type normally slidable over a mine floor during operation, said machine having a pivoted cutter bar adapted to be swung by power and held in various adjusted positions and means adapted to feed the machine bodily during cutting, of a wheeled truck to which the machine unit is fixed during cutting having provision to permit free swinging of said cutter bar while cutting on the truck, and truck wheel driving means comprising a truck wheel driving train including a friction device extraneous to said machine unit, said truck wheel driving means being manually controllable to control truck speed as desired.

50. In mining apparatus, the combination with a unitary mining machine of the type normally slidable over a mine floor, said machine having a pivoted cutter bar swingable in a horizontal plane, means for locking said cutter bar in different positions, power operated mechanism driven by the machine for swinging said bar about its pivot, of a wheeled truck on which said machine is mounted having provision for permitting free swinging movement of said cutter bar, and truck wheel driving means including a driving element on the machine, transmission connections between said driving element and the truck wheels, and a friction clutch external to said machine and interposed in said connections between said element and the truck wheels for controlling movement of the apparatus along a trackway both during transport and the cutting operation.

51. In mining apparatus, the combination with a unitary mining machine of the type normally slidable over a mine floor during operation, said machine having a pivoted cutter bar adapted to be swung about its pivot in a horizontal plane and held in different positions, power operated means including a rope connectible at will to said cutter bar to swing the latter or to an external anchorage to effect feeding of the machine, of a wheeled truck on which said machine is mounted having provision for permitting free swinging movement of said cutter bar, and truck wheel driving mechanism including a driving element, connections between said driving element and the truck wheels, and a friction clutch external to said machine and interposed in said connections between said driving element and the truck wheels for controlling movement of the apparatus along a trackway both during transport and the cutting operation.

52. In mining apparatus, the combination with a transport truck having means adapted to receive a mining machine, of a unitary separately operable mining machine supported on said truck, said machine being of the type adapted to normally slide over the mine floor during operation and comprising a pivoted cutter bar and a driving motor, and self-contained mechanism on the truck entirely separate from the mining machine and mounted independently of the latter on the truck for driving the truck wheels to propel the apparatus along the trackway at a plurality of predetermined speeds including a relatively slow cutting speed.

53. In mining apparatus, the combination with a transport truck having means adapted to receive a mining machine, of a unitary separately operable mining machine on said truck of the bottom cutting type normally slidable over a mine floor during the cutting operation and having a motor and mechanism for operating said machine as a mounted track guided cutter including a plural predetermined speed truck wheel driving mechanism and supported wholly on the truck extraneous of the machine for driving the truck wheels to propel the apparatus along the mine trackway at a relatively low cutting speed and a relatively high transport speed.

54. In mining apparatus, the combination with a transport truck having means adapted to receive a mining machine, of a unitary separately operable mining machine supported on said truck of the type adapted to operate by sliding on its own bottom and having feeding and cutting mechanism and a driving motor therefor, and self-contained mechanism on said truck extraneous of the machine and mounted independently of the latter on the truck independently of the aforesaid feeding mechanism, for driving the truck wheels to propel the apparatus along the mine trackway at a relatively low predetermined cutting speed.

55. In mining apparatus, the combination with a transport truck adapted to receive a mining machine, of a unitary separately operable mining machine on said truck of the bottom cutting type normally slidable on its own bottom during cutting operation and having a motor, and self-contained mechanism permanently mounted on the truck and supported entirely separate from the mining machine for effecting drive of the truck wheels to propel the apparatus along the mine trackway at a relatively slow predetermined cutting speed.

56. In mining apparatus, the combination with a transport truck adapted to receive a mining machine, of a unitary separately operable mining machine on said truck of the bottom cutting type normally slidable on its own bottom during cutting operation and having a motor, and self-contained mechanism permanently mounted on the truck and supported entirely separate from the mining machine for effecting drive of the truck wheels at any time and irrespective of the position of the mining machine to propel the truck and mining machine along the mine trackway at a relatively slow predetermined cutting speed and at a relatively high transport speed.

57. In mining apparatus, the combination with a unitary mining machine of the type normally slidable on its bottom during operation, said machine having a horizontally swinging cutter bar pivoted thereon and adapted to be swung by power and held in different positions and means comprising rope gearing adapted to feed the machine during cutting, a wheeled truck to which said machine unit is fixed during cutting having provision to permit free swinging of said cutter bar while cutting on the track, releasable means for holding the cutter bar against turning on its pivot, and an anchorage on the cutter bar co-operating with said rope gearing to effect swinging feeding movement of said cutter bar.

58. In mining apparatus, the combination with a unitary mining machine of the type normally slidable on its bottom during operation and comprising rope gearing adapted to feed the machine during cutting, of a pivoted carrier mounted on said truck, releasable means for holding said carrier against turning, and traction feeding means for effecting slow feeding movement of the mining machine while said carrier is held against turning.

59. In mining apparatus, the combination with a unitary mining machine comprising a pivoted cutter bar and feed gearing comprising a flexible draft member adapted to be anchored to the cutter bar to swing it or to an extraneous anchorage to effect bodily movement of the whole mining machine, of a wheeled truck, propelling mechanism for the truck comprising a motor on the truck, means for controlling the speed of travel of the truck to move it at feeding speed of the mining machine or at transport speed as desired, and means for securing said mining machine to said truck to move therewith.

60. In mining apparatus, the combination with a portable supporting frame, of a carrier pivotally mounted thereon, a unitary separately operable mining machine detachably mounted thereon and comprising rope gearing for sliding the machine over a mine floor to feed the cutter bar thereof, said mining machine having a pivoted cutter bar and means for holding the same at an adjusted angle relative to the body of the machine, and anchorages for the rope gearing to enable the latter to feed the cutter bar rectilinearly for sumping and withdrawal cuts and to feed the cutter bar angularly to connect such cuts.

61. In mining apparatus, the combination with a truck adapted to travel on a mine track, of a carrier pivoted thereto, a unitary separately operable mining machine mounted thereon and comprising rope gearing and a pivoted cutter bar adapted to be fed arcuately by said rope gearing while the mining machine is secured to said carrier, and means for holding said carrier against turning while its rope gearing is operated in connection with a suitable anchorage for effecting rectilinear feed of the cutter bar.

62. In mining apparatus, the combination with a truck adapted to travel on a mine track, of a carrier pivoted thereto, a unitary separately operable mining machine mounted thereon and comprising rope gearing and a pivoted cutter bar with an anchorage thereon for enabling said rope gearing to swing said cutter bar on its pivot, said mining machine comprising also means for holding said cutter from turning on its pivot when the mining machine is swung on the axis of said carrier, and means for holding said carrier against turning on its axis when said cutter bar is swung on its pivot.

63. In mining apparatus, the combination with a truck adapted to travel on a mine track of a carrier pivoted thereto, a unitary separately operable mining machine pivoted thereto and comprising a pivoted cutter bar and means for holding said cutter bar against turning on its axis, said mining machine also comprising rope gearing and an anchorage on the cutter bar for swinging the cutter bar on its pivot when the cutter bar is released, truck propelling mechanism for moving said truck at feeding speed along the mine track, and means for holding said carrier against turning on its axis while the cutter bar is being held against turning on its pivot and the cutter bar is being fed rectilinearly.

64. In mining apparatus, the combination with a truck adapted to travel on a mine track, of a carrier pivoted thereto on an upright axis, a unitary separately operable mining machine having a pivoted cutter bar and means comprising rope gearing for swinging the cutter bar on its pivot, means for holding the cutter bar against turning on its pivot while said rope gearing is operated to feed the cutter bar arcuately or rectilinearly, and means for preventing turning of said carrier on its pivot while said rope gearing operates to feed said cutter bar rectilinearly.

65. In mining apparatus, the combination with a truck adapted to travel on a mine track, of a carrier pivoted thereto, a unitary separately operable mining machine mounted on said carrier and comprising a pivoted cutter bar and means comprising rope gearing for swinging said cutter bar on its pivot, said rope gearing being also adapted to swing said carrier to feed said cutter bar on the axis of said carrier, said rope gearing being further adapted to effect rectilinear feed of said cutter bar, releasable locking means for holding said cutter bar at an adjusted angle, while being fed rectilinearly and while being fed arcuately on the axis of said carrier, and releasable locking means to hold said carrier at an adjusted angle while said cutter bar is being fed rectilinearly.

66. In mining apparatus, the combination with a wheeled truck, of a frame mounted thereon for adjustment relatively thereto, mechanism for adjusting the elevation of said frame relative to said truck, a carrier pivoted to said frame for rotary movement on an upright axis, a unitary separately operable mining machine mounted on said carrier and comprising a pivoted cutter bar and rope gearing for feeding the machine, and means for enabling the rope gearing to swing the cutter bar on its axis or on the axis of said carrier.

67. In mining apparatus, the combination with a truck adapted to travel along a mine track, of a carrier pivoted thereto, a unitary separately operable mining machine mounted on said carrier and comprising rope gearing, the feed end of which is adapted to be connected to anchorages in carrying out all operations including rectilinear sumping and withdrawal cuts and intermediate arcuate cuts, said mining machine including a pivoted cutter bar and means for locking the same at an adjusted angle relative to said carrier, and means for holding the carrier at an adjusted angle relative to said truck when the mining machine is making rectilinear cuts.

In testimony whereof, I affix my signature.

ARBA P. STANLEY.